(12) United States Patent
Hagist et al.

(10) Patent No.: US 7,775,777 B2
(45) Date of Patent: Aug. 17, 2010

(54) FUEL PUMP PROVIDED FOR INSTALLATION INSIDE A FUEL CONTAINER, WITH AN ADAPTER

(75) Inventors: Dieter Hagist, Lahnstein (DE); Martin Jeuk, Guckheim (DE); Matthias Kadler, Gross-Gerau (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/113,649

(22) Filed: May 1, 2008

(65) Prior Publication Data

US 2008/0296889 A1  Dec. 4, 2008

(30) Foreign Application Priority Data

May 4, 2007  (DE) ........................ 10 2007 021 026

(51) Int. Cl.
*F04B 17/00* (2006.01)
(52) U.S. Cl. .................. 417/360; 417/423.3; 417/540; 123/509; 123/198 R
(58) Field of Classification Search .................. 417/360, 417/423.3, 307, 440, 540, 543; 285/33; 123/445, 123/509, 195 A, 195 C, 198 R; 137/565.01, 137/565.11, 565.13, 565.15, 565.22, 565.23, 137/565.26, 565.35
See application file for complete search history.

(56) References Cited

U.S. PATENT DOCUMENTS

| | | | | | |
|---|---|---|---|---|---|
| 3,168,045 | A | * | 2/1965 | Sebastiani | .................. 417/383 |
| 3,648,729 | A | * | 3/1972 | Balkany | ................. 137/533.13 |
| 5,181,839 | A | * | 1/1993 | Tuckey | ........................ 417/360 |
| 5,478,046 | A | | 12/1995 | Szabo | ...................... 251/149.6 |
| 5,636,794 | A | * | 6/1997 | Hess et al. | ................ 239/284.1 |
| 5,715,798 | A | * | 2/1998 | Bacon et al. | ................. 123/514 |
| 5,799,986 | A | * | 9/1998 | Corbett et al. | ................. 285/55 |
| 2002/0125717 | A1 | | 9/2002 | Trede et al. | .................... 285/81 |
| 2003/0121691 | A1 | | 7/2003 | Inoue et al. | ............... 174/65 G |
| 2004/0169990 | A1 | * | 9/2004 | Wada | ......................... 361/212 |
| 2007/0200339 | A1 | | 8/2007 | Yagisawa et al. | ............. 285/33 |

FOREIGN PATENT DOCUMENTS

| | | |
|---|---|---|
| EP | 0536672 | 10/1992 |
| EP | 1205333 | 10/2001 |
| EP | 1701079 | 12/2004 |
| WO | 01/90629 | 11/2001 |

* cited by examiner

*Primary Examiner*—Devon C Kramer
*Assistant Examiner*—Todd D Jacobs
(74) *Attorney, Agent, or Firm*—King & Spalding L.L.P.

(57) ABSTRACT

In a fuel pump (9) with an adapter (12) there are provided latching means (16, 16') disposed opposite one another and arranged at opposite ends of rocker elements (18, 18') having a release mechanism (17, 17') which can be actuated by hand. The rocker elements (18, 18') are produced integrally with the adapter (12). By pressing together the release mechanism (17, 17') the latching mechanism (16, 16') are released from the fuel pump (9). The adapter (12) has a non-return valve (22) and/or a pressure-limiting valve (23). The fuel pump (9) can therefore be adapted to the particular application by simply exchanging the adapter (12).

13 Claims, 5 Drawing Sheets

FUEL PUMP PROVIDED FOR INSTALLATION INSIDE A FUEL CONTAINER, WITH AN ADAPTER

CROSS-REFERENCE TO RELATED APPLICATIONS

This application claims priority to German Patent Application Number 10 2007 021 026.6 filed on May 4, 2007, and which is incorporated herein by reference in its entirety.

TECHNICAL FIELD

The invention relates to a fuel pump provided for installation inside a fuel container, with an adapter for connection to the fuel pump of a section of a feed line located inside the fuel container and leading to an internal combustion engine of the motor vehicle, and with a latching connection for retaining the adapter on a connection piece of the fuel pump.

BACKGROUND

Fuel pumps with adapters of this type form part of a fuel feed unit in present-day motor vehicles and are known from practical use. The pump is usually preloaded against a base of the fuel container and connected to a flange of the fuel container via the section of the feed line located inside the fuel container. In order to connect the section of the feed line located inside the fuel container to the fuel pump, the adapter is retained in a groove of the connection piece by means of a spring clip of the latching connection. The adapter has a Christmas-tree profile for pushing the section of the feed line thereon.

However, a disadvantage of the known fuel pump with the adapter is that installation of the adapter on the fuel pump is very difficult. In addition, installation with the spring clip of the latching connection requires prior alignment of the adapter with respect to the fuel pump, which contributes to making still more difficult the fixing of the adapter through a usually very small assembly opening of the fuel container.

SUMMARY

According to an embodiment, the fuel pump with an adapter of the type mentioned in the introduction can be configured such that the adapter can be installed especially simply through a usually very small assembly opening in the fuel container. To this end, a fuel pump provided for installation inside a fuel container, may comprise an adapter for connection to the fuel pump of a section of a feed line located inside the fuel container and leading to an internal combustion engine of the motor vehicle, and latching connection for retaining the adapter on a connection piece of the fuel pump, wherein latching means of the latching connection and release means for actuating the latching means are produced integrally with the adapter, and the release means can be moved by hand from a position in which the adapter is latched to the connection piece to a position in which the adapter is released from the connection piece.

According to a further embodiment, the release means and the latching means may have a centrally-retained rocker element, the latching means may project in a hook shape at one end of the rocker element and the release means may be arranged at the other end of the rocker element, and the rocker element may be preloaded resiliently to the position in which the adapter is latched to the connection piece. According to a further embodiment, the latching means may engage behind a shoulder on the fuel pump. According to a further embodiment, two latching means each may have a respective release means and engage in opposite sides of the connection piece. According to a further embodiment, the adapter may have a vertical member for connection to the connection piece and a horizontal member for connection to the feed line. According to a further embodiment, the release means may extend over the horizontal member. According to a further embodiment, the adapter and a non-return valve and/or a pressure-limiting valve may be configured as a constructional unit. According to a further embodiment, the non-return valve and the pressure-limiting valve may be arranged in the horizontal member of the adapter. According to a further embodiment, the non-return valve can be arranged at one end of the horizontal member and the pressure-limiting valve can be arranged at the other end. According to a further embodiment, the horizontal member may have a shoulder configured as a valve seat for supporting a valve body.

BRIEF DESCRIPTION OF THE DRAWINGS

The invention admits numerous embodiments. For further clarification of its basic principle several of them are represented in the drawing and are described below. In the drawing.

DETAILED DESCRIPTION

Figure 1:
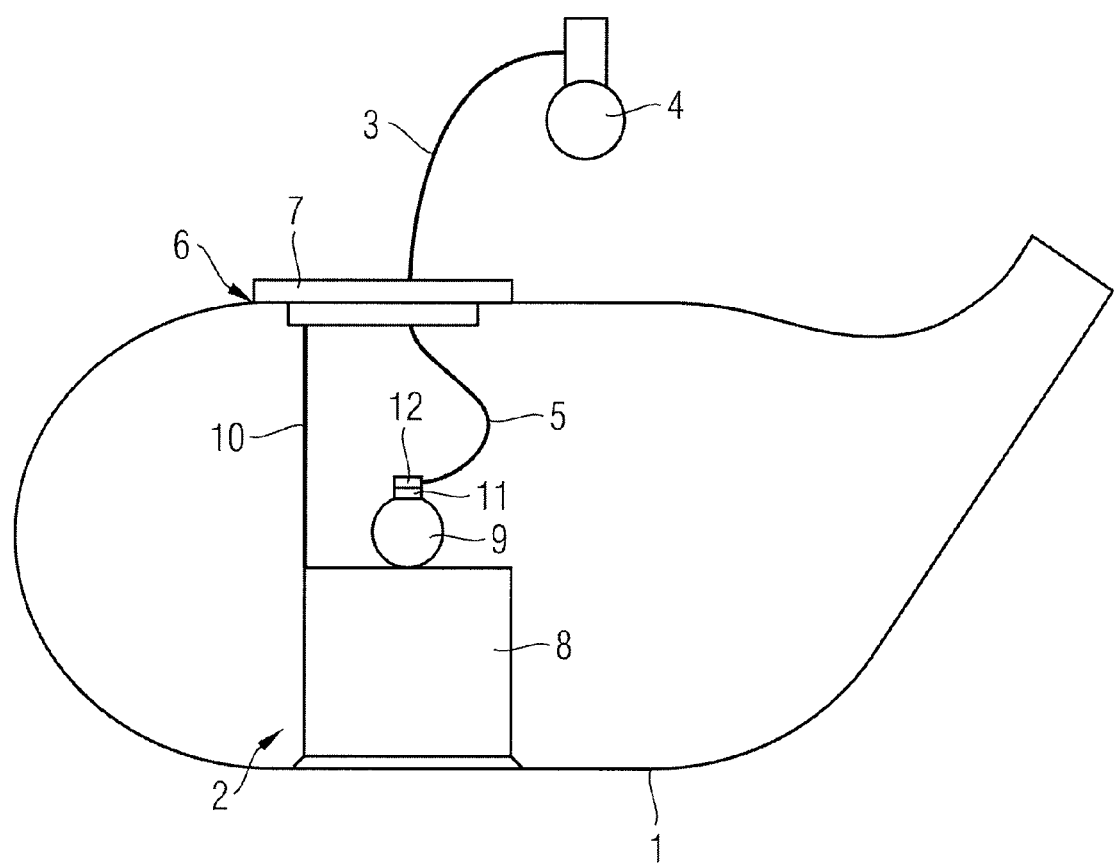
FIG. 1 shows a fuel supply installation for a motor vehicle with an fuel pump and with an adapter according to various embodiments.

As stated above, according to an embodiment, the latching means of the latching connection and release means for operating the latching means may be produced integrally, for example, as a single piece with the adapter and the release means can be moved by hand from a position in which the adapter is latched to the connection piece to a position in which the adapter is released from the connection piece.

Through this configuration, the individual components of the latching connection cannot be lost. In addition, the adapter can be grasped with one hand by the release means of the latching connection and connected to the fuel pump. At the same time the release means can be operated and the latching connection installed. The fuel pump with the adapter according to various embodiments can thereby be installed especially simply, in particular through a very small assembly opening in the fuel container. Integral production of the latching means and the release means with the other areas of the adapter makes possible especially low-cost manufacture of the components from plastics material in a single injection-molding tool.

According to an embodiment, the moving of the latching means from the latched position to the released position is implemented especially conveniently if the release means and the latching means have a centrally retained rocker element and if the latching means project in a hook shape at one end of the rocker element and the release means are arranged at the other end of the rocker element, and if the rocker element is preloaded in a spring-elastic manner to the latched position of the adapter on the connection piece. Through this configuration, the hook-shaped latching means can be simply swiveled and moved out of the range of engagement with the connection piece by pressing down the release means. The position of the release means can be sensed by hand, and changes in dependence on the position of the latching means. The quality of the connection of the adapter to the connection piece can therefore be easily verified by touch. The spring-elastic preloading to the latched position is preferably effected by the inherent elasticity of the rocker element and/or by a device fixing the rocker element to the adapter.

According to another embodiment, the fuel pump is of especially simple construction if the latching means engage behind a shoulder on the fuel pump. If rotatability of the adapter is desired, the shoulder can be configured to extend all round the connection piece of the fuel pump.

According to yet another embodiment, the latching connection of the adapter to the connection piece has especially high stability if two latching means each have a release means and engage in opposite sides of the connection piece.

According to another embodiment, the connection of the feed line to the fuel pump has an especially compact configuration if the adapter has a vertical member for connection to the connection piece and a horizontal member for connection to the feed line. This configuration is especially advantageous with present-day, usually very low fuel containers, since, with a straight configuration of the adapter, in most cases no installation space is available for accommodating the feed line.

According to a further embodiment, the release means are especially easily accessible if they extend over the horizontal member.

According to another embodiment, the number of components to be installed in the fuel container can be kept especially small if the adapter and a non-return valve and/or a pressure-limiting valve are configured as a constructional unit. A further advantage of this configuration is that high flexibility of the fuel feed can be ensured by simply exchanging the constructional unit containing the adapter. The number of variants of fuel pumps provided for different applications can be kept especially small, as it is usually sufficient to adapt the constructional unit containing the non-return valve and the pressure-limiting valve appropriately to the application. This gives rise to low costs for the fuel pump.

According to another embodiment, the adapter is especially simple in construction if the non-return valve and the pressure-limiting valve are arranged in the horizontal member of the adapter.

According to a further embodiment, it contributes to simplifying installation of the non-return valve and the pressure-limiting valve in the adapter if the non-return valve is arranged at one end of the horizontal member and the pressure-limiting valve at the other end. Through this configuration the non-return valve can be inserted in the horizontal member from one end and the pressure-limiting valve from the other end.

According to another embodiment, it contributes to reducing the number of components of the adapter if the horizontal member has a shoulder in the form of a valve seat for supporting a valve body.

FIG. 1 shows a fuel supply installation for a motor vehicle with a fuel feed unit 2 arranged in a fuel container 1. The fuel feed unit 2 is connected to an internal combustion engine 4 of the motor vehicle via a feed line 3. The feed line 3 has a section 5 arranged inside the fuel container 1 and passes through a flange 7 inserted in an assembly opening 6. The fuel feed unit 2 has a surge chamber 8 preloaded against a base of the fuel container 1 and has a fuel pump 9 arranged in the surge chamber 8. The surge chamber 8 is connected to the flange 7 via telescopic elements 10. The fuel pump 9 has a connection piece 11 with respect to which an adapter 12 is sealed. The section 5 of the feed line 3 arranged inside the fuel container 1 is connected to the adapter 12.

Figure 2:
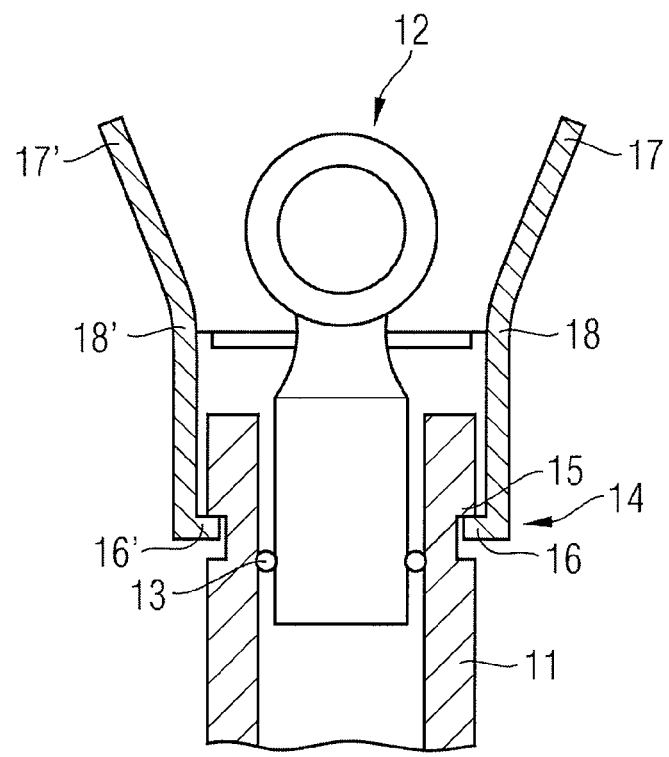
FIG. 2 shows the adapter from FIG. 1 with adjacent areas of the fuel pump in a partial section.

FIG. 2 shows the adapter 12 and the connection piece 11 of the fuel pump 9 from FIG. 1 in partial section. The adapter 12 and the connection piece 11 are sealed with respect to one another via a radial seal 13 and are connected to one another by means of a latching connection 14. The latching connection 14 has a peripheral shoulder 15 arranged in the connection piece 11, behind which two hook-shaped latching means 16, 16' of the adapter 12 engage. The latching means 16, 16' are formed integrally with respective release means 17, 17' and are arranged on centrally retained rocker elements 18, 18'. The rocker elements 18, 18' are produced integrally with the other regions of the adapter 12. Two latching means 16, 16' are disposed opposite two respective release means 17, 17'. By pressing together the release means 17, 17', the rocker elements 18, 18' are swiveled about their central retaining element, so that the latching means 16, 16' can be moved from a position in which they are latched to the connection piece 11 to a position in which they are released with respect to the connection piece 11. Through their inherent elasticity, the rocker elements 18, 18' spring back to the position in which the latching means 16, 16' engage behind the shoulder 15. A tool is not required for this. In addition, by feeling the positions of the release means 17, 17' it can be determined whether the latching connection 14 is engaged as intended.

Figure 3:
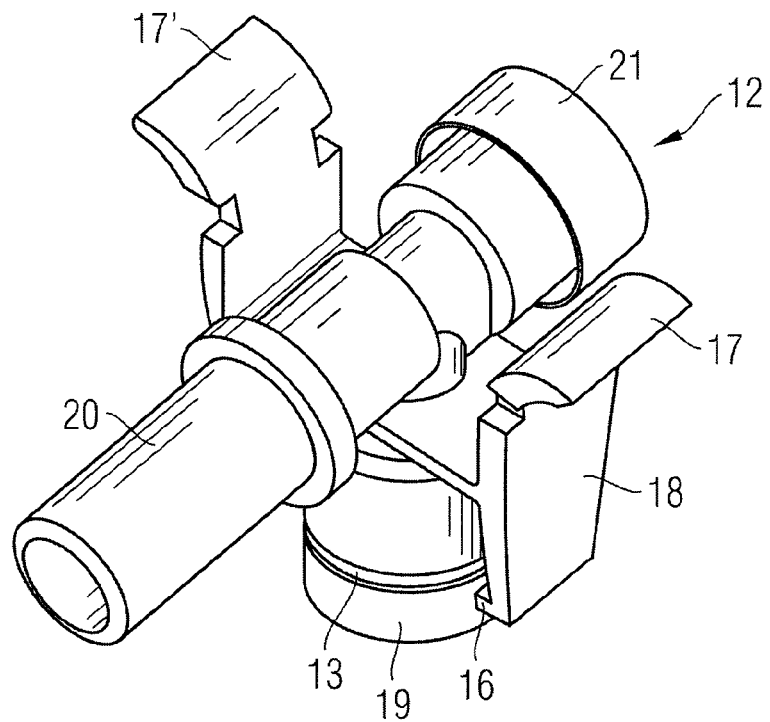
FIG. 3 shows the adapter from FIG. 1 in a perspective representation.

FIG. 3 shows the adapter 12 from FIG. 2 in a perspective representation. The adapter 12 has a vertical member 19 projecting into the connection piece 11 from FIG. 2, and a horizontal member 20 provided for connection of the section 5 of the feed line 3 arranged inside the fuel container 1. To simplify the drawing, the section 5 of the feed line 3 arranged inside the fuel container 1 is not shown here. The feed line 3 may be pushed onto the end of the horizontal member 20 of the adapter 12 or may be produced integrally therewith. The section 5 of the feed line 3 arranged inside the fuel container 1 is preferably configured as a corrugated tube. A cap 21 is arranged on the other end of the horizontal member 20.

Furthermore, the radial seal 13 is arranged on the vertical member 19.

Figure 4:
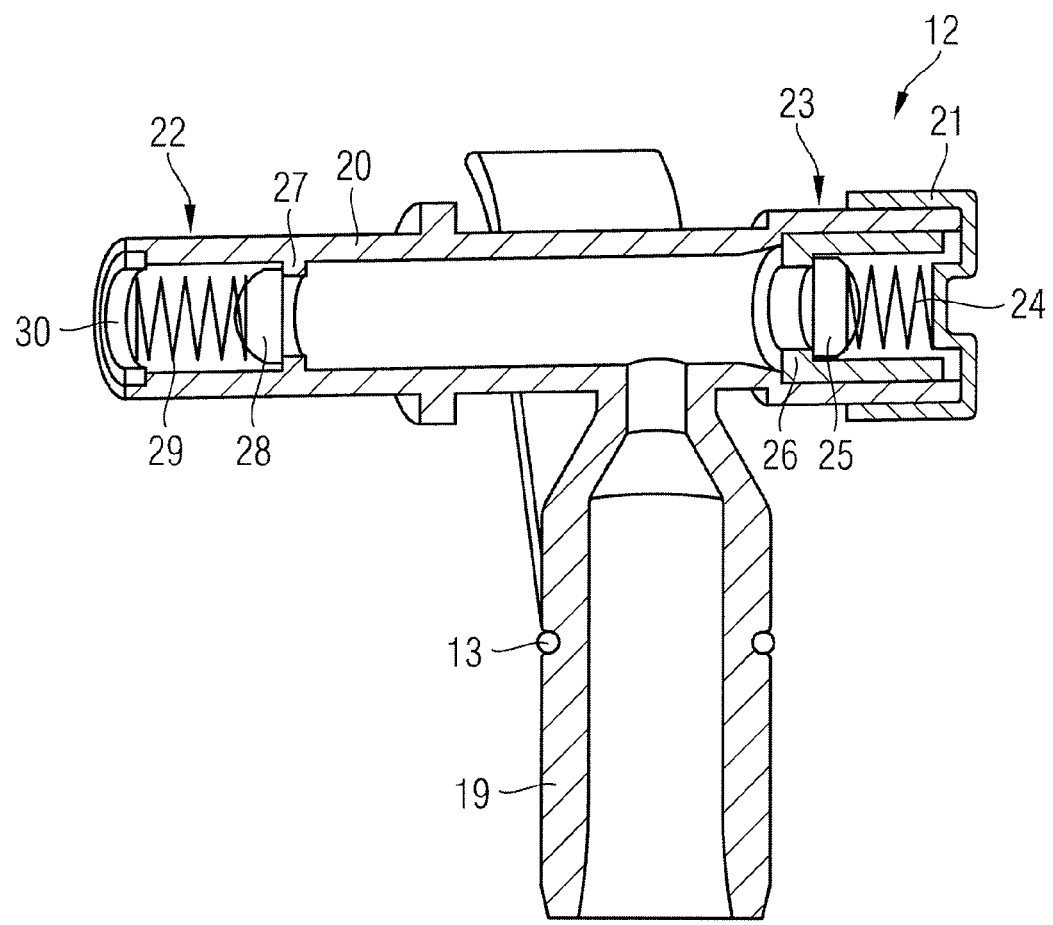
FIG. 4 is a sectional representation through the adapter from FIG. 3.

FIG. 4 shows, in a sectional representation through the adapter 12 from FIG. 3, that a non-return valve 22 and a pressure-limiting valve 23 are arranged in the horizontal member 20. The non-return valve 22 is arranged in the end of the horizontal member 20 provided for connection of the two feed lines 3. The cap 21 forms part of the pressure-limiting valve 23 arranged at the other end of the horizontal member 20 and supports a spring element 24 which preloads a valve body 25 against a valve seat 26 pressed into the horizontal member 20. The horizontal member 20 has a shoulder 27 as a valve seat for the non-return valve 22. A valve body 28 is preloaded against the shoulder 27 by means of a spring element 29. The spring element 29 bears against a clip 30 pressed into the horizontal member 20.

Figure 5:
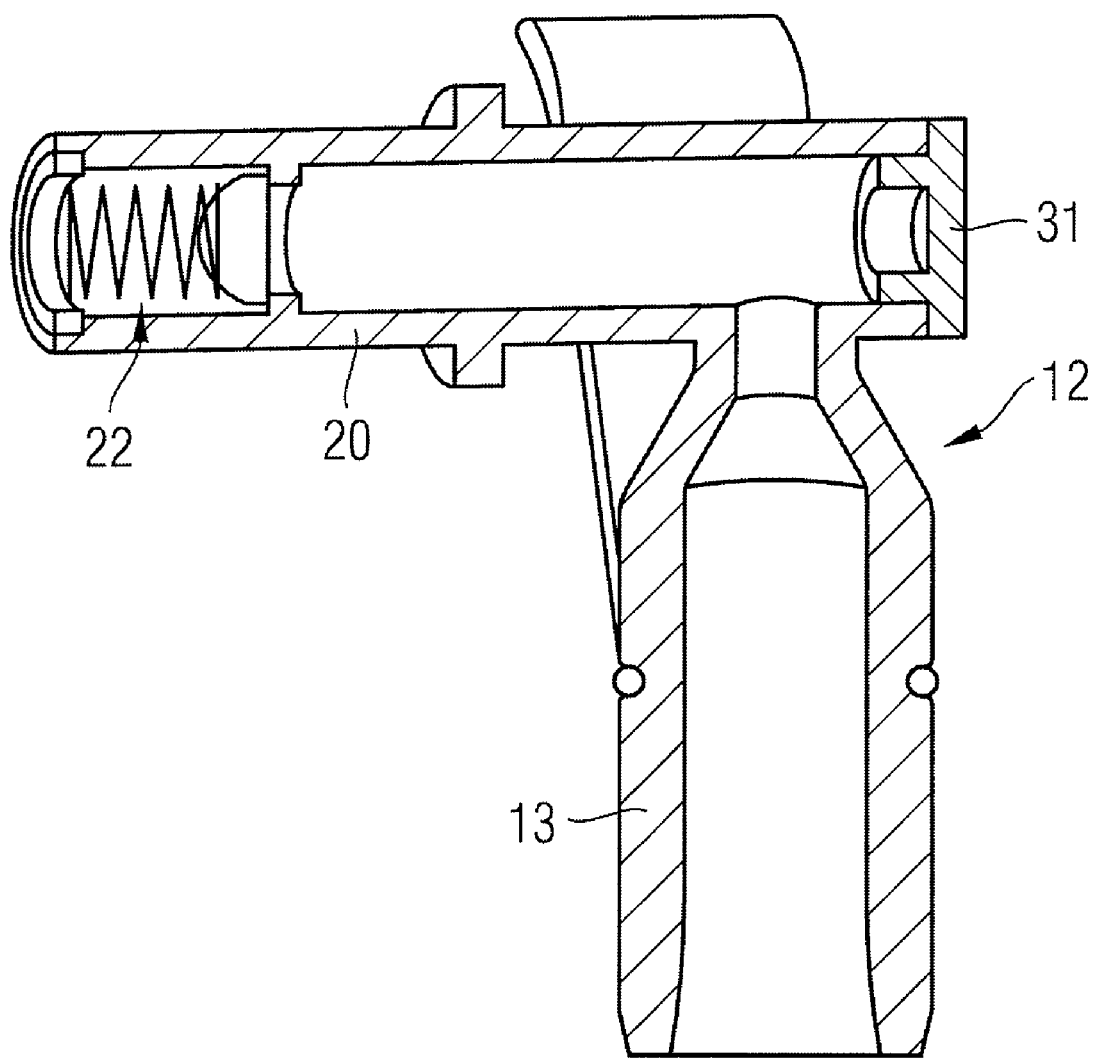
FIG. 5 is a sectional representation through a further embodiment of the adapter.

FIG. 5 shows a further embodiment of the adapter 12 from FIG. 1 in a sectional representation, which differs from that of FIG. 4 only in that the end of the horizontal member 20 oriented away from the non-return valve 22 is closed by a plug 31.

Figure 6:
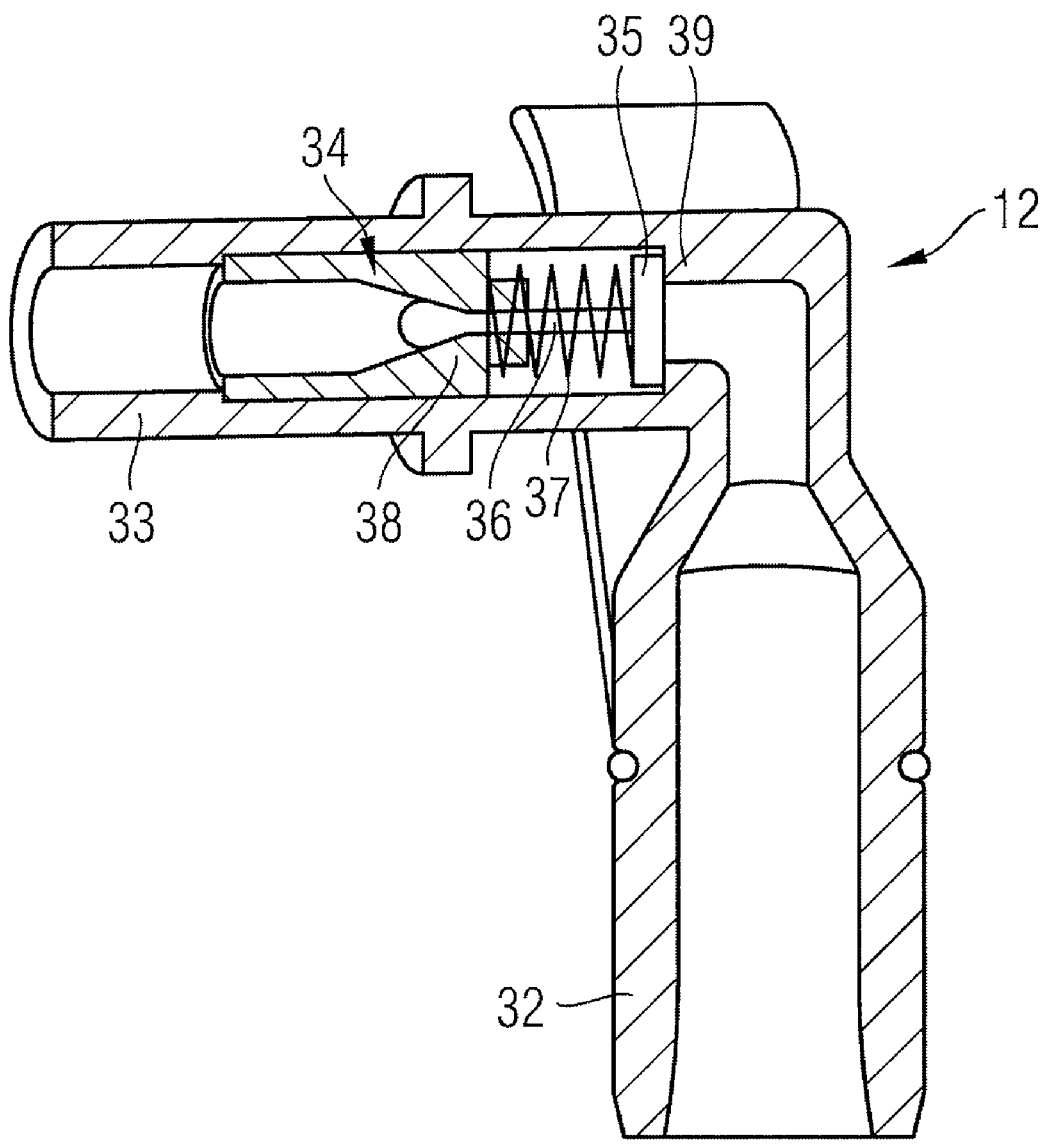
FIG. 6 is a sectional representation through a further embodiment of the adapter.

FIG. 6 shows a further embodiment of the adapter 12 from FIG. 1 in a sectional representation in which a vertical member 32 forms a bend with respect to a horizontal member 33.

A non-return valve 34 has an elastomer seal 35 against which a plunger 36 is preloaded by means of a spring element 37. The plunger 36 is guided in a guide 38 pressed into the horizontal member 33. The guide 38 also supports the spring element 37. On the side of the elastomer seal 35 opposite the plunger 36 the horizontal member 33 has a shoulder 39.

What is claimed is:

1. A fuel pump provided for installation inside a fuel container, comprising an adapter that connects the fuel pump to a section of a feed line located inside the fuel container and leading to an internal combustion engine of a motor vehicle, and a latching connection for retaining the adapter on a connection piece of the fuel pump, wherein latching means of the latching connection and release means for actuating the latching means are produced integrally with the adapter, and the release means can be moved by hand from a position in which the adapter is latched to the connection piece to a position in which the adapter is released from the connection piece, wherein the adapter has a vertical member for connection to the connection piece and a horizontal member for connection to the feed line, wherein the horizontal member extends completely across the vertical member to form a T-shape with the vertical member, with a non-return valve located at a first portion of the horizontal member extending beyond the vertical member in a first direction, and a pressure-limiting valve located at a second portion of the horizontal member extending beyond the vertical member in a second direction opposite the first direction, and wherein a cap is secured to the end of the horizontal member extending in the second direction, the cap forming a portion of the pressure-limiting valve.

2. The fuel pump according to claim 1, wherein the release means and the latching means have a centrally-retained rocker element, the latching means projects in a hook shape at one end of the rocker element and the release means are arranged at the other end of the rocker element, and the rocker element is preloaded resiliently to the position in which the adapter is latched to the connection piece.

3. The fuel pump according to claim 1, wherein the latching means engage behind a shoulder on the fuel pump.

4. The fuel pump according to claim 1, further including a second latching means, wherein each of the two latching means has a respective release means and engage in opposite sides of the connection piece.

5. The fuel pump according to claim 1, wherein the release means extends over the horizontal member.

6. The fuel pump according to claim 1, wherein both the non-return valve and the pressure-limiting valve are configured as a constructional unit with the adapter.

7. The fuel pump according to claim 1, wherein the horizontal member has a shoulder configured as a valve seat for supporting a valve body.

8. A fuel pump comprising:

a fuel container;

an adapter coupled with a section of a feed line located inside the fuel container and leading to an internal combustion engine of a motor vehicle, and a latching connection for retaining the adapter on a connection piece of the fuel pump comprising a latch and a release operable to actuate the latch, wherein the latch and release are formed as a single piece, and the release is operable to be moved by hand from a position in which the adapter is latched to the connection piece to a position in which the adapter is released from the connection piece, wherein the adapter has a vertical member for connection to the connection piece and a horizontal member for connection to the feed line, wherein the horizontal member extends completely across the vertical member to form a T-shape with the vertical member, with a non-return valve located at a first portion of the horizontal member extending beyond the vertical member in a first direction, and a pressure-limiting valve located at a second portion of the horizontal member extending beyond the vertical member in a second direction opposite the first direction, and wherein a cap is secured to the end of the horizontal member extending in the second direction, the cap forming a portion of the pressure-limiting valve.

9. The fuel pump according to claim 8, wherein the release and the latch have a centrally-retained rocker element, the latch projects in a hook shape at one end of the rocker element and the release is arranged at the other end of the rocker element, and the rocker element is preloaded resiliently to the position in which the adapter is latched to the connection piece.

10. The fuel pump according to claim 8, wherein the latch engages behind a shoulder on the fuel pump.

11. The fuel pump according to claim 8, further including a second latching means, wherein each of the two latching means has a respective release and engage in opposite sides of the connection piece.

12. The fuel pump according to claim 8, wherein the release extends over the horizontal member.

13. The fuel pump according to claim 8, wherein the adapter, the non-return valve, and the pressure-limiting valve are configured as a constructional unit.

* * * * *